(12) United States Patent
Glassman

(10) Patent No.: US 11,507,785 B2
(45) Date of Patent: Nov. 22, 2022

(54) ANOMALY DETECTION SYSTEM USING MULTI-LAYER SUPPORT VECTOR MACHINES AND METHOD THEREOF

(71) Applicant: BAE Systems Information and Electronic Systems Integration Inc., Nashua, NH (US)

(72) Inventor: Martin S. Glassman, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 422 days.

(21) Appl. No.: 16/862,867

(22) Filed: Apr. 30, 2020

(65) Prior Publication Data

US 2021/0342652 A1    Nov. 4, 2021

(51) Int. Cl.
    *G06K 9/62*      (2022.01)
    *G06N 20/10*     (2019.01)
    *G06N 20/20*     (2019.01)

(52) U.S. Cl.
    CPC ......... *G06K 9/6269* (2013.01); *G06K 9/6228* (2013.01); *G06K 9/6232* (2013.01); *G06K 9/6262* (2013.01); *G06K 9/6289* (2013.01); *G06N 20/10* (2019.01); *G06N 20/20* (2019.01)

(58) Field of Classification Search
    CPC .. G06K 9/6269; G06K 9/6228; G06K 9/6232; G06K 9/6262; G06K 9/6289; G06N 20/20; G06N 20/10
    See application file for complete search history.

(56) References Cited

U.S. PATENT DOCUMENTS

| | | | |
|---|---|---|---|
| 2008/0201281 A1* | 8/2008 | Graf | G06K 9/6269 706/12 |
| 2011/0106735 A1 | 5/2011 | Weston et al. | |
| 2016/0337133 A1 | 11/2016 | Yiu et al. | |
| 2018/0204111 A1 | 7/2018 | Zadeh et al. | |
| 2019/0041845 A1 | 2/2019 | Cella et al. | |

OTHER PUBLICATIONS

Ergen et al, "A novel distributed anomaly detection algorithm based on support vector machines," Jan. 8, 2020, Digital SignalProcessing99(2020) 102657 (9 pages) (Year: 2020).*
International Search Report, PCT/US21/29784, dated Oct. 6, 2021, 20 pages.

* cited by examiner

*Primary Examiner* — David F Dunphy
(74) *Attorney, Agent, or Firm* — Sand, Sebolt & Wernow LPA; Scott J. Asmus

(57) ABSTRACT

A classifier network has at least two distinct sets of refined data, wherein the first two sets of refined data are sets of numbers representing the features values data received from sensors or a manufactured part. Performing, via at least two distinct types of support vector machines using an associated feature selection process for each classifier independently in a first layer, anomaly detection on the manufactured part. Then, using the stored data including refined data of at least two different types of data transforms and performing, via at least a two distinct types of support vector machines in a second layer, an associated feature selection process for each classifier independently. Forming at least four distinct compound classifier types for anomaly detection on the part using the stored data or coefficients. The ensemble of second layer support vector machine outputs compare the results to determine the presence of an anomaly.

9 Claims, 5 Drawing Sheets

ANOMALY DETECTION SYSTEM USING MULTI-LAYER SUPPORT VECTOR MACHINES AND METHOD THEREOF

STATEMENT OF GOVERNMENT INTEREST

This invention was made with government support under Contract No. W58RGZ-13-D-0245, awarded by the United States Army. The government has certain rights in the invention.

TECHNICAL FIELD

The present disclosure relates to an anomaly analysis apparatus, method, and a non-transitory computer readable storage medium thereof. More particularly, the present disclosure relates to an anomaly analysis apparatus, method, and non-transitory computer readable storage medium that is related to machine learning and support vector machines.

BACKGROUND

With the rapid development of the science and technology, numerous manufacturing technologies are now available. Manufactured parts using these new technologies may pass standard quality control checks but still operate abnormally due to many factors.

Some technologies detecting anomalies or defects in a manufactured part by using machine learning models are conventionally available. For example, some conventional technologies require a user to determine which parameters are more important based on his/her experience and then use these parameters to train a machine learning model for detecting an anomalies. However, different manufactured parts and anomalies will be influenced by different factors, so the determination result made by the user for each manufactured part is often unsuitable for another manufactured part. Additionally, some other technologies perform analysis only for some portions or features of the manufactured part and not for the entire manufactured part, so the model obtained through training is unsuitable for other manufactured parts.

SUMMARY

Accordingly, a need exists in the art to provide a technology which is capable of objectively selecting more important features of a manufactured part, whether those features be unprocessed input data, sets of processed input data using domain appropriate filtering and/or analysis functions, or feature space projections generated by classifier outputs internal to the system, in conjunction with the optimization of an ensemble of classifiers of diverse types, operating on selected features as distinct sets of inputs to each member of the diverse set of classifiers, each distinct subset of features being the result of a joint classifier/feature set optimization procedure for each classifier run independently for each classifier in the ensemble, for detecting and analyzing anomalies during various steps in the manufacturing, calibration and/or certification process.

In one embodiment, a missing step in a calibration process, during which calibration image data is acquired as a fundamental component of data necessary for image sensor compensation, manifests itself as multiple types of patterns impressed on the calibration data. These patterns have a high level of variance associated with their manifestation. The combination of varying patterns and statistical variance within each pattern type make it difficult even for subject matter experts to have confidence in detecting the lack of the missing step in the calibration procedure. Due to the nature of the underlying gap in the production process, only a very small set of examples of the anomalies may be available for classifier training, exacerbating the detection problem, and limiting the architectural options for a manufactured part anomaly detection system.

The anomaly analysis apparatus in one exemplary embodiment comprises a storage unit and a processor electrically connected to the storage unit. The storage unit stores the coefficients resulting from training the support vector machines (SVM), which define the SVM for use with new data. If using a nearest neighbor based classifier (which is an alternative option for additional diversity), then the storage unit would store the selected feature values for each training example, or else only for selected representatives of the training dataset. Additionally, the storage unit may store a plurality of part data, wherein each of the part data comprises a plurality of part feature values. The processor is configured to dimension-reduce each of the part data to generate discriminatory projections through the process of a linear projection onto an optimized discriminant axis, in which the projection is the result of a process of classification model optimization by minimizing the training error in classifying the training data into a plurality of first normal data and a plurality of first abnormal data according to a classification optimization technique.

The processor can also be configured to select separate subsets, not included in a randomly selected training dataset, which are randomly sampled over a predetermined number of iterations, according to a bootstrapped cross-validation procedure, of the sampled training data as a plurality of testing data, and derive an accuracy rate by testing the classification model using the second, separate subsets of training data used as "holdout" sets in a bootstrapped cross-validation procedure. Notably, this could be applied to the entire network to estimate overall error rate, however it may prohibitive to do that over the entire network in terms of the CPU time required.

The disclosure also includes a manufactured part anomaly analysis method, which is adapted for an electronic computing apparatus. The electronic computing apparatus in one example embodiment stores a plurality of part data, wherein each of the part data comprises a plurality of manufactured part feature values. The manufactured part anomaly analysis method comprises: (a) pre-processing the raw part feature values using sets of complementary filters and analysis techniques, in order to extract as much information potentially usable for detection of parts which need to be labeled as having insufficient quality for incorporation into the final system. Preprocessing by sets of complementary filters and analysis techniques does not preclude the use of raw part feature values, if they are determined also to be usable by classifiers for discrimination; (b) iteratively dimension-reducing each of the part data onto optimized linear discriminant axes by analyzing the manufactured part feature values comprised in the part data according to a linear discriminant optimization technique based on margin maximization, in parallel with an algorithm which rank orders features by a measure of classification utility, for incremental removal from the active feature sets during the process of iterative linear discriminant optimization with each incrementally rank ordered and culled set of features; (c) sequentially, in a feedforward, layer-by-layer fashion, processing the ensemble of optimized classifier outputs for use as inputs to a succeeding ensemble of classifiers of diverse types, using the preceding classifier outputs as internal feature values for input to the succeeding layer; (d) aggregating the outputs of the ensemble of diverse, optimized classifiers at the output layer, according to a technique selected from the range of known and proven techniques in the state of the art, to utilize the multiple outputs of an ensemble of classifiers to yield more accurate and robust classification decisions, in order to classify a manufactured part as either of acceptable quality or not.

The disclosure further includes a non-transitory computer readable storage medium, which has a computer program stored therein. After the computer program is loaded into an electronic computing apparatus, the electronic computing apparatus executes the codes of the computer program to perform the manufactured part anomaly analysis method described in the above paragraph.

The anomaly analysis technology (including the apparatus, method, and the non-transitory computer readable storage medium thereof) disclosed herein adopt techniques related to machine learning to train the classification models that are used for detecting the manufactured part anomaly. Generally, the manufactured part anomaly analysis technology provided by the present disclosure analyzes the manufactured part feature values comprised in the collected part data according to the dimension-reduce technique so as to generate a set of optimized linear discriminant axes, onto which are projected the input feature vector data, and which then create an optimized feature space for manufactured part classification based on the optimization of large margin linear discriminants. In parallel with the large margin linear discriminant optimization, the set of features used as input to the large margin classifier is also optimized through the use of a recursive feature selection method, automatically excluding the least important features which degrade classifier performance, and selecting the optimum set of features as measured by the accuracy using a bootstrap cross-validation technique with all available training data. Due to the relative paucity of training data available in the case of defects or skipped steps in the part manufacture or calibration process, all available training samples are split randomly into training and test sets, using sampling with replacement (bootstrapping) for selection of a given instance of training data, while holding out the non-selected training samples as cross-validation test set data. This process of randomized selection (bootstrapping) of training data is repeated a multiplicity of times, in order to effect an estimate of classifier performance on each of the recursively defined feature subsets, based on the theory of bootstrap based statistical estimation. Due to the limitation of the size of defect and/or skipped manufacture or calibration steps, no separate validation set of samples is used. The process of bootstrap-based classifier accuracy estimation makes more effective use of the limited available training data than a single, pre-selected holdout set. Anal classifier performance estimation using a single, pre-defined holdout set (a validation set) may be more a function of the particular set of samples chosen, and not representative of the mean and variance of classifier performance expected in use in the field with new part data; Thus, the anomaly detection system of the present disclosure does not diminish the available size of the training sample set in order to define a validation test set in this system of classifier training.

Since the operations of the manufactured part anomaly analysis technology provided by the present invention starts from analyzing the manufactured part feature values comprised in all the collected part data, it is suitable for various manufactured part environments. Moreover, the manufactured part anomaly analysis technology provided by the present invention trains the classification model using the optimization technique of linear discriminant margin maximization so the overfitting phenomenon caused by less important manufactured part feature values in the training process can be minimized based on the theory of large margin classifiers. Thereby, the accuracy rate regarding classifying manufactured part anomalies can be increased with the result that detection of manufactured part anomalies becomes more accurate.

The detailed technology and preferred embodiments implemented for the subject invention are described in the following paragraphs accompanying the appended drawings for people skilled in this field to well appreciate the features of the claimed invention.

In one aspect, an exemplary embodiment of the present disclosure may provide for testing a manufactured part for anomalies wherein the testing comprises; receiving at least one set of feature values data from at least one sensor or the manufactured part, wherein the feature values data comprises feature values data from the sensor or manufactured part; extracting at least two sets of refined data, each set being based on distinct, domain and part appropriate feature extraction operators, wherein the at least first two sets of refined data are sets of numbers representing meaningful transformations or analyses of the features values data received from the sensors or manufactured part; storing the refined data sets as stored data sets; performing, via at least two first layer support vector machines of distinct types, using a feature selection process associated with each support vector machine independently, also forming a pooled feature set comprising those features selected for input to each classifier in the first layer, processing on the manufactured part using the stored data sets so as to project the refined data onto internal feature axes having the properties of enhanced detection of anomalies, and performing, via at least a second layer support vector machines of at least two different types, using a feature selection process associated with each support vector machine independently, anomaly detection on the manufactured part using the outputs of the first layer support vector machines and the pooled feature set by using the second layer support vector machine outputs to compare or combine the results to determine the presence of an anomaly.

In another aspect, an exemplary embodiment of the present disclosure may provide a storage unit, being configured to store a plurality of feature values data in a features database and/or support vector machine coefficients in a separate database, wherein each of the feature values data comprises a plurality of feature values; a microcomputer comprising instructions, which when executed by the microcomputer, causes the microcomputer to be configured to; receive the feature values data of a manufactured part, wherein the feature values data comprises raw feature values data from a scan, image, test, status, or output of a manufactured part; extract at least two sets of refined data, wherein the at least two sets of refined data, each set extracted using a distinct, domain and part appropriate feature extraction operator, is a set of numbers representing the transformations or analyses of the feature values data received from the scan, image, test, status, or output of a manufactured part; process, the at least two sets of refined data as a representation of specific mechanical properties, chemical properties, output of the manufactured part or other similar properties of the manufactured part using the at least two distinct types of first layer support vector machines, using a feature selection process associated with each support vector machine independently, each pair of SVM types processing the output of the at least two sets of refined data, also forming a pooled feature set comprising those features selected for input to each classifier in the first layer, in order to project the refined data onto internal feature axes optimized to enhance anomaly detection, and storing the processed data as stored data; and a feature database coupled to the microcomputer and configured to store, based on first layer support vector machine processing of the two sets of refined data, the two sets of processed, refined data as the first layer support vector machine outputs, wherein the microcomputer is further configured to perform, based on at least one set of first layer outputs of at least two support vector machines, and the pooled feature set, anomaly detection on the part using the stored, processed, refined data, using at least one second layer of at least two distinct types of support vector machines, connected in such a way with the outputs of the first layer of support vector machines, and the pooled feature set, to form an ensemble of at least six distinct compound types of classifiers.

In another aspect, and exemplary embodiment of the present disclosure may provide a classifier system and a cloud-based anomaly detection apparatus operatively connected to sensors and the manufactured part comprising: a microcomputer, wherein the microcomputer comprises instructions which when executed by the microcomputer, causes the microcomputer to be configured to: store a plurality of feature values data in a features database and/or support vector machine coefficients in a separate database, wherein each of the feature values data comprises a plurality of feature values; a microcomputer comprising instructions, which when executed by the microcomputer, causes the microcomputer to be configured to: receive the feature values data of a manufactured part, wherein the feature values data comprises raw feature values data from a scan, image, test, status, or output of a manufactured part; extract at least two sets of refined data, wherein the at least two sets of refined data, each set extracted using a distinct, domain and part appropriate feature extraction operator, is a set of numbers representing the transformations or analyses of the feature values data received from the scan, image, test, status, or output of a manufactured part; process, the at least two sets of refined data as a representation of specific mechanical properties, chemical properties, output of the manufactured part or other similar properties of the manufactured part using the at least two distinct types of first layer support vector machines, using a feature selection process associated with each support vector machine independently, each pair of SVM types processing the output of the at least two sets of refined data, also forming a pooled feature set comprising those features selected for input to each classifier in the first layer, in order to project the refined data onto internal feature axes optimized to enhance anomaly detection, and storing the processed data as stored data; and a feature database coupled to the microcomputer and configured to store, based on first layer support vector machine processing of the two sets of refined data, the two sets of processed, refined data as the first layer support vector machine outputs, wherein the microcomputer is further configured to perform, based on at least one set of first layer outputs, and the pooled feature set, of at least two distinct types of support vector machines, using a feature selection process associated with each support vector machine independently, anomaly detection on the part using the stored, processed, refined data, using at least one second layer of at least two distinct types of support vector machines, using a feature selection process associated with each support vector machine independently, connected in such a way with the outputs of the first layer of support vector machines, and the pooled feature set, to form an ensemble of at least six distinct compound types of classifiers.

In yet another aspect, an exemplary embodiment of the present disclosure may provide a system comprising: at least two feature types generating transformations of the raw data into arrays or matrices of feature data for each type; at least two different types of trainable classifiers adapted to have real valued outputs representing statistical confidence in a classification; feature selection logic associated with each trainable classifier adapted to winnow down the set of feature data from each view that will be used as input to each classifier processing data from that view during system operation; a first layer of at least two distinct types of classifiers operating on the features output from each feature type in isolation from the processing of data from other feature types; a feature pooling function that combines the sets of selected features from each feature type into a pooled feature set, wherein the feature pooling uses all features selected for the classifiers in the first layer; at least two distinct classifier types operating on the pooled feature set; a second layer of classifiers receiving inputs from outputs of the at least two distinct types of classifiers in the first layer associated with all feature types adapted to form a compound classifier type, wherein the compound classifier includes one type of classifier processing output from another type of classifier or feature set to provide an array of any combination of individual and compound classifier types at the second layer; and an output function to combine outputs from the layer of classifiers operating on the pooled feature set and the second layer of classifiers in parallel. This exemplary embodiment or another exemplary embodiment may further provide wherein one of the at least two distinct types of classifier in the first layer operating on the features output is an SVM. This exemplary embodiment or another exemplary embodiment may further provide a plurality of linear SVMs for recursive feature elimination (RFE) for feature selection adapted to control a feature selection process. This exemplary embodiment or another exemplary embodiment may further provide RBF SVMs, wherein the plurality of linear SVMs are used as sidecars to control the RFE in conjunction with the RBF SVMs. This exemplary embodiment or another exemplary embodiment may further provide a grid search classifier hyperparameter optimization wrapper around the RFE adapted to optimize any of the hyperparameters available for each type of classifier with regard to training. This exemplary embodiment or another exemplary embodiment may further provide a bootstrapped cross validation error rate estimation added to the RFE, where bootstrapped cross validation error rate estimates are obtained with each iteration of the RFE. This exemplary embodiment or another exemplary embodiment may further provide a margin area measure for the bootstrapped cross validation error rate estimation adapted to establish an optimal operating point with respect to which feature set, over the set of iterations as features are removed, should be the feature set used in operation of the system for each classifier. This exemplary embodiment or another exemplary embodiment may further provide sigmoid functions adapted to control the dynamic range of the outputs of each classifier type and normalizing those across the classifiers. This exemplary embodiment or another exemplary embodiment may further provide a plurality of additional layers of multiple classifier types adapted to form additional compound classifier types to operate as an ensemble with associated adaptive sigmoid functions and a statistical combination of outputs across the plurality of additional layer as the final output of the network. This exemplary embodiment or another exemplary embodiment may further provide an additional layer including a single classifier adapted to function as an output node for the network that is trained to provide an optimal decision boundary in the feature space composed by the previous layer of classifier outputs.

In yet another aspect, an exemplary embodiment of the present disclosure may provide a method comprising: testing a manufactured part for anomalies wherein the testing comprises; receiving at least one set of feature values data from at least one sensor or the manufactured part; extracting at least two sets of refined data, wherein the two sets of refined data are sets of numbers representing features values data received from the sensors or manufactured part; classifying the at least two sets of refined data as a representation of a property or output of the part and storing the at least two sets of refined data as stored data; performing, via at least a first support vector machine, anomaly detection of the manufactured part using the stored data and performing, via at least a second support vector machine, anomaly detection of the manufactured part using the stored data; and using at least a second layer including at least a third support vector machine that is the same type of support vector machine as the first support vector machine receiving outputs from the first layer, and at least a fourth support vector machine that is the same type of support vector machine as the second support vector machine receiving outputs from the first layer, and at least a fifth support vector machine that is the same type of support vector machine as the first support vector machine receiving the pooled feature set as inputs, and at least a sixth support vector machine that is the same type of support vector machine as the second support vector machine receiving the pooled feature set as inputs, connected to provide a parallel set of at least six compound classifier types, the outputs of which are compared or combined to determine the presence of an anomaly. This exemplary embodiment or another exemplary embodiment may further provide wherein the feature values data represents data from a scan, image, test, or output of the sensor or manufactured part. This exemplary embodiment or another exemplary embodiment may further provide wherein the method is cloud based. This exemplary embodiment or another exemplary embodiment may further provide wherein the support vector machines are either radial basis function (RBF) or Linear. This exemplary embodiment or another exemplary embodiment may further provide wherein performing, based on the minimum specification of a network of support vector machines, anomaly detection on the part using the stored data comprises: constructing an anomaly classifier based on a decision directed system; and calculating the presence of an anomaly based on the stored data, wherein the presence of the anomaly comprises at least a difference at which an anomaly occurs.

In yet another aspect, an exemplary embodiment of the present disclosure may provide an apparatus comprising: a storage unit, being configured to store at least one of a plurality of feature values data or a plurality of coefficients data in a features or coefficients database, wherein each of the feature values data comprises a plurality of feature values and each of the coefficients values data comprises a plurality of coefficient values; a non-transitory computer readable storage medium comprising instructions, which when executed by a processor, causes operations configured to: receive the feature values data of a manufactured part, wherein the feature values data comprises raw feature values data from a scan, image, test, or output of the manufactured part; extract at least two sets of refined data, wherein the two sets of refined data are numbers representing the feature values data received from the scan, image, test, or output of the manufactured part; classify the at least two sets of refined data as a representation of a specific mechanical property, chemical property, output of the manufacture part or other similar property of the manufactured part and storing the refined data as stored data; and a feature database of SVM coefficients or coefficients associated with any similar form of classifier after training coupled to the processor and configured to store, based on classification of the two sets of refined data, the two sets of refined data as the classified raw feature values data, wherein the processor is further configured to perform, based on at least ten support vector machines of at least two distinct types, in an arrangement forming at least two layers of support vector machines of at least two distinct types and an ensemble of compound classifier types formed by combinations of the distinct types of classifiers between a first layer and a second layer processing the at least two sets of refined data, anomaly detection on the manufactured part using the stored data. This exemplary embodiment or another exemplary embodiment may further provide wherein the support vector machines are either RBF or Linear. This exemplary embodiment or another exemplary embodiment may further provide wherein the anomaly detection apparatus further comprises a central database coupled to the microcomputer and the feature database, and wherein the central database is configured to: parse the features values data to obtain parsed feature values data; classify the parsed raw sensor data as classified parsed raw sensor data as a representation of a specific mechanical, chemical or other similar property of the part and storing, after classifying the raw parsed sensor data, the classified raw parsed sensor data, wherein the classified raw parsed sensor data corresponds to the at least two sets of refined data, wherein extracting the at least two sets of refined data from the raw sensor data comprises extracting the classified raw parsed sensor data from the raw parsed sensor data.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
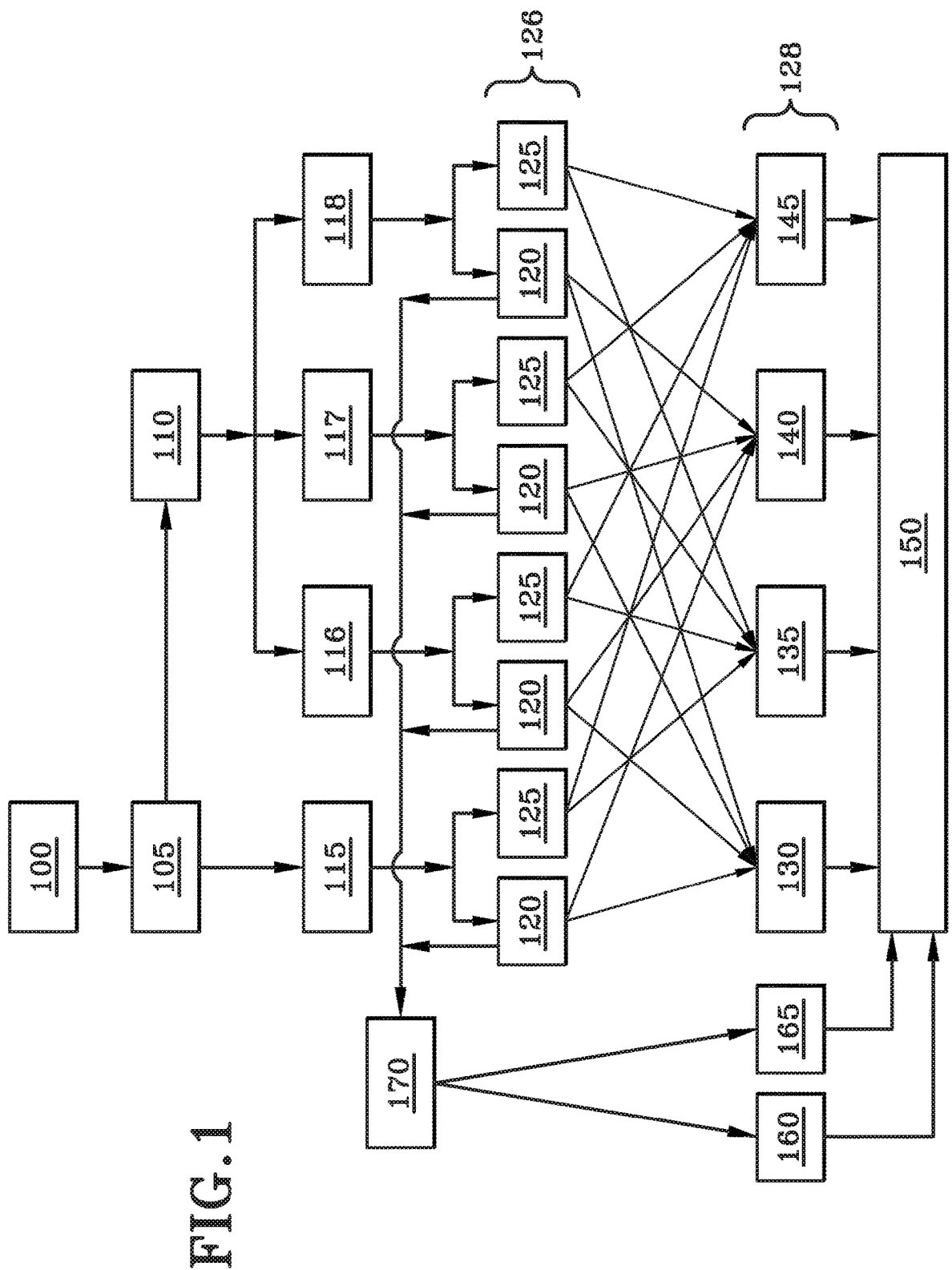
FIG. 1 (FIG. 1) is a schematic of the operation of the systems processing and classifier architecture according to one embodiment.

Some manufactured parts undergo a quality assurance check or calibration check as part of the routine production process. A missing step in a calibration process, during which calibration image data is acquired as a fundamental component of data necessary for image sensor compensation, may manifest itself as multiple types of patterns impressed on the calibration data. These patterns additionally may have a high level of variance associated with their manifestation. The combination of varying patterns and statistical variance within each pattern type may make it difficult even for subject matter experts to have confidence in detecting the lack of the missing step in the calibration procedure. Due to the nature of the underlying gap in the production process, typically only a very small set of examples of the anomalies are available for classifier training, exacerbating the detection problem, and limiting the architectural options for a classifier network.

In machine learning, support-vector machines (SVMs, also support-vector networks) are supervised learning models with associated learning techniques that analyze data used for classification and regression analysis. Given a set of training examples, each marked as belonging to one or the other of two categories, an SVM training technique builds a model that projects new examples onto a discriminant axis optimized during the training process to increase the separability of data from each category using the well known statistical learning principal of margin maximization. The value of data projected onto the optimized discriminant axis can be used for binary classification, in conjunction with the corresponding SVM optimized threshold, or as a measure of membership, or probability of membership (using, for example, a method such as Platt scaling), using the real value result of the projection. An SVM model is a representation of the examples as points in space, mapped onto a new, synthesized axis, orthogonal to the orientation of the hyperplane which is adjusted during the training process so as to optimize the separation of the data (the margin width) in the input space, so that the examples of the separate categories are divided by a clear gap that is as wide as possible. The gap, also commonly referred to as the margin, implements a hyperplane decision boundary with non-zero thickness, such that the boundaries of the gap are hyperplanes equidistant from the hyperplane that defines the decision boundary. By maximizing the width of the margin through an optimization process operating on the training examples, there is a theoretical guarantee of best performance in generalizing to new data unseen during the training process. New examples are then mapped onto the optimized discriminant axis, and can then be used as inputs, optimized with respect to class discriminabililty, to succeeding SVM's or other types of classifiers. The values of new examples mapped onto the optimized discriminant axis can also be used to categorize the data, in a binary way, based on the polarity of the data, as zero on the discriminant axis represents the center of the margin in the input feature space.

In addition to performing linear classification, SVMs can efficiently perform a non-linear classification using what is known as the "kernel trick," implicitly mapping their inputs into high-dimensional feature spaces. The data in the non-linear internal feature space is then projected onto a linear discriminant axis using the principal of margin maximization, allowing the SVM to use a non-linear transformation of the data in order to increase the probability of finding an optimized discriminant axis allowing linear separation of the data, after non-linear transformation of the data to a higher dimensional feature space.

When data is unlabeled, supervised learning is not possible, and an unsupervised learning approach is required, which attempts to find natural clustering of the data to groups, and then map new data to these formed groups. The support-vector clustering technique applies the statistics of support vectors, developed in the support vector machines technique, to categorize unlabeled data, and is one of the most widely used clustering techniques in industrial applications.

In order to handle the inherent variability of this data, along with the extremely limited set of examples available for training, a supervised classifier with a shallow, multi-layer architecture has been designed with the goal of detecting multiple, highly variable manifestations of the underlying anomaly. This is achieved through the use of a multi-view feature set processed by a cascade of arrays of both linear and radial basis function kernel (RBF) SVM's, trained in a layer-by-layer fashion with a robust feature selection process deeply embedded in the training procedure. The use of a large library of features coupled with feature selection, the large margin property of the SVM, and a layer-by-layer training paradigm yields a highly accurate yet compact system for manufactured part classification. Avoidance of the use of backpropagation allows effective discrimination to be developed with relatively small training datasets, as compared with the typical requirements for training dataset sizes with the classical multi-layer perceptron (MLP's) and the more recently developed deep neural networks (CNN's, or convolutional neural networks) trained using backpropagation. The random initialization of weights typically used in the standard training of classifiers using a multi-layer perceptron based architecture generally requires long training times, since optimization via gradient descent is done simultaneously across all hidden unit coefficients, therefore the optimization search space has the dimensions of the total number of coefficients in the overall network, in comparison to layer-by-layer, and hidden unit (SVM) by hidden unit optimization, wherein the optimization search space is only the dimensionality of the number of coefficients needed for each SVM. For example, if all hidden units (SVM's) used the same number of features as inputs, d, and there were n SVM's in the network, then the CPU load for optimization would be proportional to $n*f(d+1)$, where $f( )$ is the SVM optimization/search algorithm time. In comparison, in an MLP formulation, replacing the n SVM's with the total of input, hidden, and output units (totaling n), the CPU load for optimization would be proportional to $h(n*(d+1))$, where $h( )$ represents the MLP backpropgation optimization algorithm time, since all coefficients associated with each feature (note that a bias term is added to the number of features) will be optimized simultaneously, instead of in smaller groups associated with the optimization of each hidden unit separately.

It should be clear that as the size of the network grows, the computational burden expressed as h( ) to optimize an MLP type networks grows dramatically, as the number of possible combinations of values of the coefficients, where coefficients are quantized to a value of q, grows as $(1/q)^{n(d+1)}$ in comparison to a network in which each hidden unit is optimized separately, where the number of possible combination of coefficients only grows as $n(1/q)^{(d+1)}$. While either form of optimization algorithm used for SVM's or MLP's clearly do not evaluate all possible combinations of quantized coefficients, this still gives a sense of the relative size of the coefficient search spaces using either n replications of a space of size (d+1), or a single space of size n(d+1). In addition, it is well known in the literature that the convergence of backpropagation suffers from the fact that the error from the output layer needs to be, literally, propagated backwards in order to optimize the earlier layers; since the output layers cannot be effectively optimized until the earlier layers develop discriminatively meaningful transformations of the input data, and the training of the randomly initialized early layers is driven by error which is diffused backwards from randomly initialized later layers, effectively dampening the backpropagated error signal, there is a significant amount of training time simply devoted to the process of the early layers beginning to train effectively using the diffused backpropagated error signals, which is then followed by the more effective training of the later layers after the earlier layers have effectively developed meaningful feature extraction functions. Therefore it should be clear that the method of feedforward, layer-by-layer training tends to be much more efficient with regard to training time than the technique of backpropagation used to train the entire network simultaneously, from both the standpoint of the size of the coefficient search space, in combination with the way that error signals are used to drive the optimization in both architectures. There is a further distinction which relates to the existence of multiple, local minima when using gradient descent to train a network, as in backpropagation, and the convex optimization techniques used to train each hidden unit in a network of SVM's, as the training of SVM's most commonly uses the technique of convex optimization, guaranteeing a unique local minimum for each hidden unit, which then also guarantees a unique global minimum for a network of hidden units which are SVM's. Note that it is also possible to use other forms of classifier in this architecture, such as the k-nearest neighbor classifier, which in it's basic form requires no training, and therefore also exhibits no local minima. It can then be seen that the layer-by-layer, hidden-unit-by-hidden-unit training paradigm is both efficient in CPU resources, and perhaps more importantly, does not suffer from the problem of settling into a sub-optimal solution due to the process of gradient descent getting stuck in a local minimum. The hidden unit discriminants in current MLP or CNN architectures are also not trained with the objective of large margin properties. Large margin discriminants, trained using the support vector machine technique (SVM's), have theoretically optimum generalization performance by maximizing the separation between data of the two classes along the discriminant axis (which defines the hyperplane decision boundary orientation). Therefore, margin maximization in hidden units, through the use of SVM's as hidden units, will also contribute to generalization accuracy. This is because a successive sequence of operations which, layer by layer, improve the separation between classes along discriminant axes, will ultimately improve the separation between classes at the output layer of the classifier. In order to prevent errors introduced by hard decisions using "hard margin" SVM's, a soft margin implementation allows for robust handling of non-linearly separable training data and linear or nonlinear combination of parallel SVM's in an ensemble fashion.

Therefore building a manufactured part classifier system of SVM's layer-by-layer, in a feedforward fashion, is a way to develop a classifier system comprised of hidden units, all exhibiting large margin/soft margin properties. The technique of training layer-by-layer classifiers for manufactured parts classifier systems has been demonstrated to be an effective classifier training technique with the capability to yield competitive results with current, state of the art deep neural networks trained using backpropagation. Layer-by-layer training in the process of incremental construction of the manufactured part classifier allows for an appropriate match of the manufactured part classifier complexity with the dataset, in terms of size and/or difficulty of the classification problem. In a similar fashion as locating the optimum number of training iterations with regard to cross-validation performance, layer-by-layer training allows determination of the level of manufactured part classifier complexity, albeit on a level quantized by the number of layers (although it is possible to add hidden units to each layer in a more complex implementation of this paradigm), which gives the best cross-validation performance.

Since, SVM's, because of the theory of large margin classifiers, do not suffer from "the curse of dimensionality", a manufactured part anomaly detection system constructed of SVM's as hidden units will have the same property at the manufactured part classifier system level. This is proven by the fact that SVM's directly above the output layer 150 will demonstrate that property, and are in fact, recursively fed by layers of SVM hidden units insensitive to dimensionality. While in practice there will be deviation from that theoretical property for each SVM in the manufactured part classifier system, the relative insensitivity to the curse of dimensionality for each SVM is greater than for any other type of hidden unit, so that suppression of sensitivity to the effects of relatively large numbers of features with respect to the size of the training dataset is a fundamental property of the manufactured part classifier system at every level, in a multiplicative way. Considering each SVM as suppressing the sensitivity to variance induced by the curse of dimensionality, then each succeeding layer acts to further suppress this sensitivity, namely, a property referred to in the literature as "progressive linear separability."

One of the exemplary system design perspectives in this disclosure is the use of a variety of feature extraction operators (or feature types, or "views") which are intended to capture phenomena that are infrequent, and exhibit multiple, varying manifestations. This approach has come to be known as a "multi-view" architecture. Multi-view learning or learning with multiple distinct feature sets is a rapidly growing direction in machine learning with sound theoretical underpinnings and great practical success. The most common conception of a multi-view feature set are features extracted from varying forms of input, which is the predominant perspective of what a "view" is, such as image data, audio, text, webpage links, etc. However, it is also recognized that disparate feature extraction operators applied to the same input data is also a valid application of this paradigm, as is the case in this disclosure where there is only one image as input per sensor. It has been shown that multi-view learning often works effectively, in practice, with multiple views generated from data with one single view. Current exploration of view construction techniques that can be found in the literature include random splits, the random subspace method, feature clustering, pseudo multi-view co-training, genetic algorithm based selection of feature subsets, and the use of multiple kernel based similarity measures effecting differing views through the variation in the resultant spatial relationships between samples. The current disclosure takes the approach that each view is defined as the set of feature vectors output from each of domain appropriate distinct feature extraction operators, using the same raw image data from a sensor as input.

FIG. 1 depicts the preprocessing and classifier architecture of the system. The raw data for the processing of the system is inputted into the system in block 100. The raw data for processing can be processed by automatically or manually selected feature extraction operators, transforms, or groups of statistical measures, selected for their appropriateness for extracting what are anticipated to be discriminatory mechanical properties, chemical properties, or other similar properties of the manufactured part. The data is first processed by a function that provides segmentation and extraction of data of interest, 105, and then by geometric transformations and techniques of geometric dimensionality reduction, 110. A group of statistical analyses. 115, uses the extracted data of interest to provide the array of statistical features for further processing, while the set of manually defined feature extraction operators, filters, or transforms, and including other parallel feature extraction operators, each of which outputs a feature array for data processing, as illustrated by 116, 117, and 118 in FIG. 1, but including other parallel feature extraction operators in the current system. AH of these croups of features will be operated on independently by a feature selection algorithm or process in a "wrapper" arrangement using an SVM for evaluation, comparison, and selection of the optimum generated feature sets, and finally projected onto SVM discriminative axes using the resultant optimized feature set, for a better discriminative representation of an anomaly, Features which are selected can be any feature that is determined to be essential, either independently, or in a synergistic fashion with other selected features, for a particular application. Feature selection is always used with each SVM.

The arrays of feature values, 115, 116, 117, and 118, used in the anomaly detection system are comprised by a selection of some basic feature extraction operators designed to use functions which are matched to the data in a meaningful way, in terms of generating features which have the power to discriminate between classes. According to one embodiment, the most basic feature group comprises a set of statistical features operating on the raw image data after segmentation. A boundary segmentation function defines the region of interest (ROI) used for the raw image data statistics group. A non-linear geometric transformation, starting from the circular field of view defined by the boundary detection, provides a rectangular array, defined by radial and roll angle axes, for further processing for feature extraction. The remaining feature types are functions which operate on this rectangular array. These include a multi-scale set of oriented 2D Gabor filters, both 1D (on marginal projections) and 2D FFT's (on the rectangular arrays), wavelet scalograms operating along the two radial and roll marginal projection axes, and a set of geometric features operating on the set of individual levels of a contour analysis. The choice of the individual feature extraction operators is not unique, and has been, (and should be) chosen in an application-specific manner. The basic requirement for a set of feature extraction operators in the multi-view paradigm is a complementary set of functions which provide distinct views of the data, such that each feature type provides some information gain with respect to the overall set, with the goal of optimized detection of multiple manifestations of underlying issues.

The feature values 115, 116, 117, and 118 are then subjected to at least two different, independent, support vector machines, also known as support vector machine techniques, Each support vector machine technique (SVM) is independently looking for an anomaly. The support vector machines, 120 and 125, can be the of the same kernel type, trained with different parameters or independently sampled training data examples, or different kernel types for each feature value 115, 116, 117, and 118. The support vector machines can be linear, radial basis function (RBF), polynomial, or any other type of nonlinear kernel SVM, in conjunction with a specified optimization algorithm (which is one of the set of hyperparameter options used to define the training regime for each SVM) that is compatible with the anomaly detection system. Note that the same type of SVM, such as an RBF SVM, can be trained using either distinct optimization algorithms, or with distinct hyperparameters (such as the setting of a cost parameter, or selection of a particular loss function). SVM's using identical kernel types, but trained with distinct hyperparameters, become distinct SVM types in practice, effectively expanding the library of SVM types that can be applied in this architecture. At a minimum, distinct SVM's can be generated using identical sets of hyperparameters, using a bootstrapping approach to generating sets of training examples which are randomized using bootstrap sampling with replacement. Since each set of randomized training sets is unique, SVM's trained using bootstrapping, while otherwise using identical hyperparameters, will still have some property of distinctiveness from SVM's trained in the identical way.

Each SVM 120, 125 in the first layer 126 can be viewed simultaneously as an individual classifier, to be used in a stacking ensemble architecture, or else viewed as an optimized projection onto a single axis in order to pass optimized, distilled discriminatory information to the next layer. The first layer 126 is therefore both an ensemble of classifiers as well as a hidden layer (FIG. 4) projecting feature selected data into a new feature space whose axes are the outputs of each SVM in the first layer.

For each distinct type of SVM, the system can be trained on sets of individual features which are selected for optimized generalization performance using a wrapper technique combined with bootstrapped cross-validation training for each uniquely defined feature set in an iterative process of feature subset selection. In the process of "recursive feature selection", the feature with the lowest ranking in terms of estimated utility is removed, followed by re-training the SVM, followed by re-ranking the features of the reduced size feature set using the estimates of accuracy obtained from the bootstrapped cross-validation procedure. This process repeats until only one feature is left. In this system, the ability to trim a feature set down to a single feature, if indeed a single features is optimal at a particular node in the network, will be shown to allow the ultimate level of flexibility in adapting the architecture of the network with respect to the problem domain and available data. The cross-validation accuracy is estimated for each unique feature set during the process of recursive feature elimination, and the chosen feature set for a particular SVM, for a particular feature extraction operator type, is the one with the highest estimated cross-validation accuracy averaged over a predetermined number of bootstrap re-samplings of the data for training and cross-validation hold out sets.

The outputs of the first layer 126 of support vector machines, 120 and 125, are used as inputs to the second layer 128 of support vector machines 130, 135, 140, 145. Like the first layer 126 of SVMs, the makeup of the second layer 128 SVM's can be changed during the process of developing a classifier for a particular manufactured part or sensor, based on the judgement of the system designer. The number of views, feature extraction operator types, SVM kernel types and hyperparameter options are predefined architectural features of the overall classifier, and are not learned automatically, but can be modified for the purpose of overall system performance optimization by the system designer as experience is gained in a particular manufacturing application.

Providing a set of distinct feature groups for input defines the form of input to the classifier, choosing a classifier architecture which takes advantage of the design of the front end feature extraction is also a critical element in achieving effective discrimination performance. In one embodiment, the first layer 126 of the classifier is comprised of two types of SVM's, linear, 120, and radial basis function (RBF) 125, each of which is trained to optimize classification performance on an associated view in this multi-view architecture. Each SVM hidden or output unit is further optimized alongside the SVM optimization technique, through the use of an embedded feature selection technique operating in parallel with a hyperparameter grid search. In the two different implementations of this classifier that have been developed for two different types of image data, either six or eight distinct feature types are used to generate feature sets for input to the SVM's.

Since the number of informative features in each feature set can (and does) vary widely both individually and in combination with other features, this architecture is designed to provide some degree of normalization of the weights across feature sets using three complementary methods.

The first method is a feature selection technique which makes intensive use of bootstrapped cross-validation coupled with a unique measure indicating effective margin width at each point in the feature selection process. Feature selection is not only effective in practice to optimize classifier performance, but in our application, also helps to equalize the numbers of features output from each view, thereby reducing the disparity in the "weight" of each feature group, in the sense of weight being proportional to the number of (normalized) features within each group. Feature selection is combined with hyperparameter selection for each SVM in a wrapper configuration, using a "sidecar" linear SVM for feature ordering in recursive feature elimination (RFE). RFE is a technique which uses the magnitudes of SVM feature coefficients to indicate the importance of each feature after SVM training. After each iteration of SVM training on a distinct feature set, the entire feature set is ranked by coefficient magnitude, and features with the lowest values of absolute magnitude are removed prior to the next iteration. The result of each iteration is not only a rank ordered list of features, but also bootstrapped cross-validation estimates of error rate, so that a curve of error rate vs. feature set size (and composition) is generated. For each SVM in the manufactured part anomaly detection system, then, the set of features and associated hyperparameters is chosen based on minimum error over the RFE process. The trained SVM associated with that feature set associated with the minimum error point is then saved as the SVM that will be used for that hidden unit or node in the manufactured part classifier in processing new sensor data, in deployment of the classifier.

The second method of weight equalization across views is the utilization of each of the first layer 126 SVM's as a way of projecting feature data, from each selected feature set from each view, onto a corresponding set of discriminative axes. In one exemplary implementation, there are two discriminative axes output for each view, one output by each of the two types of SVM's (linear and RBF) associated with each view. The distillation of the dimensionality of each view, no matter what the size, to a pair of projections onto discriminative axes exactly equalizes the output from each view in terms of the number of features passed on to the second layer 128. But the primary result of this process is that it provides a highly discriminative feature space, relative to each "view feature space", as input to SVM's at the second layer 128.

In the third method of view weight equalization, a selected subset of a limited number of the selected features from each view is submitted to a pooled feature set, 170. The feature selection process associated with each Linear SVM 165, then doubles as a way to supply a controlled number, for balance across feature types or views, of the best features from each type to a pooled set of features which are input directly, in one embodiment, to SVM's 160 (linear) and 165 (RBF) in the second layer 128 via "skip connections" (in deep learning parlance). In one embodiment, only the linear SVM's are used to submit selected subsets of features to the pooled feature set. This does not preclude the submission of limited numbers of features to the pooled feature set from the RBF SVM's, or any other type of SVM's that might be used. Beyond simply being another method of weight equalization, the generation of a pooled feature set allows SVM's in the second layer 128 to take advantage of synergistic correlations between features across distinct feature sets to provide additional discriminatory information at the second layer 128.

The second layer 128 of SVMs is then presented with two complementary feature spaces. The first is the set of optimized projections within each feature type or view, namely, the linear and RBF SVM projections for each view. The second is a feature space defined by the pooled, most discriminatory, selected subsets of features from each feature type. The second layer 128 SVM's, 130, 145, 140, and 145, therefore see distilled versions of the total input feature space, using the projection method, while SVM's 160 & 165 see distillation via the pooling technique.

The SVM's in the second layer 128 which receive the view projections are also of both types (linear and RBF), are trained in the same way, using the wrapper method of feature and hyperparameter selection with the "sidecar" linear SVM for recursive feature elimination. The primary distinction of the second layer 128 is that it now takes two different types of outputs from the two types of feature space distillation processes (pooling and projection).

The use of the two basic types of SVM is chosen for their complementary properties. The linear SVM is optimized to reveal linear separations between classes in feature space. Clearly not all (nor even most) problems are amenable to such a simple solution as a single linear discriminant, unless the input feature space is quite rich with usable transformations, in which case the SVM training effectively also implements a weighted form of feature selection, by enforcing the large margin objective. The RBF SVM acts much more like a weighted nearest neighbor classifier, allowing data from each class that remains in a more clustered arrangement, even with a rich feature set, to be discriminated by effecting a more flexible adjustment of the default decision boundaries than would be manifest in the standard nearest neighbor classifier. While it is unlikely, for a non-trivial discrimination problem, that any given individual SVM at the hidden layer 126 provides perfect discrimination, as assessed by cross-validation, it is much more likely that SVM's taking the hidden layer outputs as inputs have the capability to use complementary information over the hidden layer 126 feature space, and provide a higher level of accuracy at the level of the second layer 128. From the following discussion of the diverse set of classifier types defined by sequences of SVM types, layer-by-layer, it is clear that this architecture can be extended to any number of layers necessary to achieve a desired level of performance, given an appropriate level of manufactured part classifier complexity relative to the training dataset size.

In one embodiment, the manufactured part classifier can be viewed as being comprised of an ensemble of diverse classifiers within a limited range of diversity. It is widely acknowledged that an effective ensemble learning system should consist of individuals that are not only accurate, but diverse as well, that is, a good balance should hold between diversity and individual performance. In this embodiment, at the second layer 128, there are six types of classifiers effectively synthesized, comprising the overall classifier system: "Pooling→Linear SVM", "Pooling→RBF SVM", "Linear SVM→Linear SVM", "Linear SVM→RBF SVM", "RBF SVM→Linear SVM", and "RBF SVM→RBF SVM". The output layer 150 is an ensemble of all of these six types of sub-classifiers at the second layer 128 (although the two SVM's taking input from the pooled feature set can either be seen as second layer nodes with skip connections from the raw feature sets bypassing the first layer 126, or else at the first layer, with skip connections to the output layer 150). The output of this manufactured part classifier system is currently formulated as using either a mean or minimum over the sub-classifier outputs, where the sub-classifiers are the six second layer 128 SVM types. The use of a third layer in a stacking formation, to train weights for a more optimal combination of sub-classifiers is possible. If a trainable classifier is added at the third layer, as a single output unit, the network will then be transformed from an ensemble of classifiers into a more traditional network with the output unit (classifier) generating a single measure of classification confidence. While additional layers increase the capacity of the network, with the potential detriment to generalization accuracy, it can also have the effect of optimizing the relative weighting of the ensemble of second layer classifiers, resulting in improved accuracy. Therefore adding this optional output unit must be evaluated in terms of cross-validation accuracy to determine its incremental effect on performance. Note that, with a single output unit, due to the capability of feature selection, that it is possible for only one second layer classifier to be selected as an active input to the output node. The feature selection capability, in like fashion, also extends backward to the first layer, so that after training it is theoretically possible for the entire network to have only one single feature selected across all views, and one classifier type selected in the overall network. An extreme example of this could then result in feature #12 from view #2 as the input to a compound classifier of the form "Linear SVM→RBF SVM→Linear SVM" (if the output node is a linear SVM). What this example does is to illustrate the extreme flexibility in the resultant network architecture after training—any and all combinations of features from individual views and the pooled feature set, along with any combination of classifiers at the first and second layers can be selected to be "active" as the result of feature selection in training, since all inputs to each layer are treated as features.

Also note, as will be discussed in further detail in this document, that additional layers of classifiers can be added incrementally as required. For example, the third layer, instead of consisting of a single classifier functioning as an output node, may be specified to be another layer of diverse classifiers, taking their inputs from the second layer, to form an ensemble of classifiers prior to a statistical combination of their outputs, or else as input to either a fourth layer single classifier functioning as an output node, or yet another layer of diverse classifiers.

One embodiment of this system can be used for screening calibration data. A second embodiment of this system can be used with a secondary form of calibration image data, and can be modified for any special case use in order to satisfy a request for discrimination of any two classes on any form of real valued data obtained from the manufacturing process, in either the format of an image, or other matrix form which can be meaningfully processed as if it were an image.

When a hidden unit is a non-linear SVM or other non-linear classifier, a linear SVM is used as a "sidecar" as an efficient way to rank order features for elimination in a recursive feature elimination technique. The wrapper method for feature selection uses the performance of a classifier to evaluate the utility of each unique combination of features. Recursive feature elimination is a desirable technique as it allows for the interactions between all features to be considered before removing features from the set. This is in opposition to a forward feature selection search in which features are incrementally added to the set, which is a process which is never able to take advantage of potential synergistic effects of features in combination, namely, features which independently, or in small considered groups, may not show promise, but may in fact be useful in the context of a larger group of features.

Figure 2:
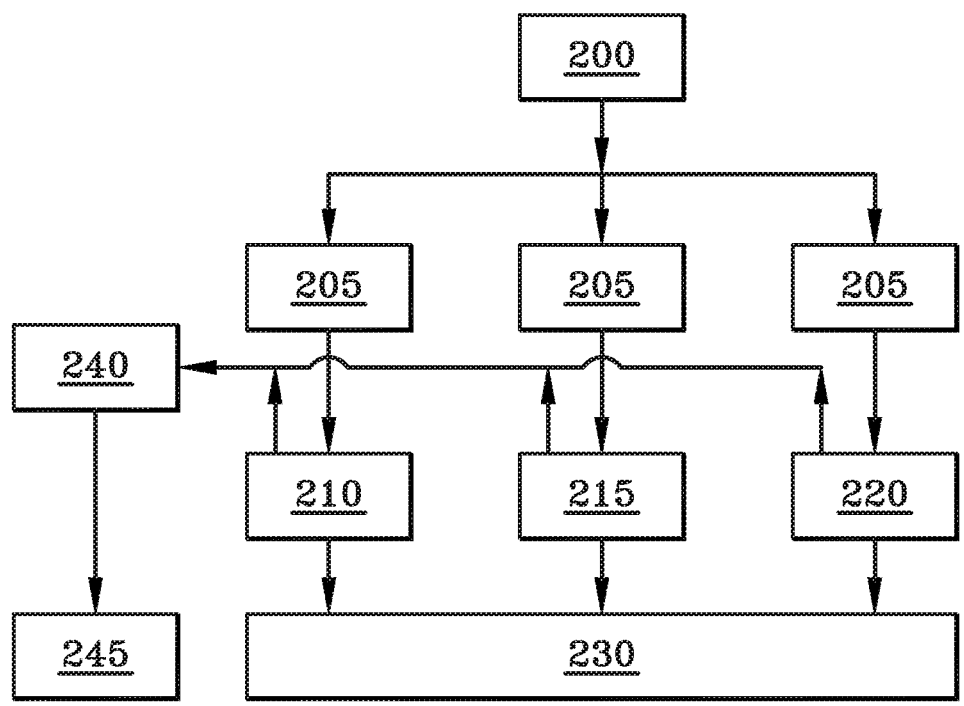
FIG. 2 (FIG. 2) is a schematic of the operation of a first type of SVM in the first layer of the presently disclosed system according to one embodiment.

FIG. 2 depicts an exemplary linear SVM used in the system. The raw data, 200, is fed to an independent set of feature extraction operators, 205, which transform the raw data into independent views of the raw data according to distinct, domain appropriate analyses, filters, and transforms. The feature outputs from each view are then fed to a set of linear SVMs, 210, 215, 220. The outputs of these SVMs are collected and sent to the next SVM layer, 230. In one embodiment, the linear SVMs, 210, 215, 220, also provide subsets of the highest ranked of the selected features data to a pooled data set, 240, which is then independently sent to the second SVM lawyer, 245. Note that other embodiments may utilize the selected subsets of features at this layer from other types of classifiers (such as an RBF SVM), since feature selection rankings in a generalized wrapper formulation are dependent upon the classifier being used.

The standard recursive feature elimination process starts with a full set of features and removes, at each iteration, the feature which is estimated to contribute the least to classification performance. The absolute magnitude of the coefficient of feature in a linear discriminant is used as a proxy for the utility of the feature in discrimination. This technique may be used exclusively with a linear SVM, due to the fact that the magnitude of linear SVM coefficients after training can be interpreted as feature importance factors; this applies only to the linear SVM. Assuming some reasonable type of normalization of each individual feature, the coefficients of the linear discriminant (after training using an SVM technique) are an indicator of the weight associated with each feature in the decision making process. Features with the lowest weights after training are likely to be noise or not have useful discriminatory information for the problem at hand (they may vary, but not in a correlated way with the class of the training data). The features with the lowest coefficient magnitudes are then prime candidates for elimination at each step.

For other types of classifiers, such as an RBF SVM, or a nearest neighbor based (k-NN) classifier, there is no comparable measure that can be applied to this process that is the result of training using a given feature set. In the case of non-linear classifiers, such as an RBF SVM or k-NN classifier, a direct measurement of the effect of removing each feature from the current set can be obtained, but this would require re-training the classifier a number of times equal to the number of features in the current set, namely, a requirement which could add orders of magnitude of CPU time to this process in typical applications (meaning typical feature set sizes). For example, with a feature set size of 4000, in the neighborhood of some of the feature groups we use in this application, instead of the 3999 iterations required for complete evaluation with RFE, it would take 8,002,000 iterations by evaluating the removal of each feature at each point in each iteration (before removing the one feature which contributes least to reducing the error rate or increases it by the most). This would be a practically untenable level of computation for a single SVM, let alone a manufactured part classifier system consisting of multiple layers of multiple SVM's.

Figure 3:
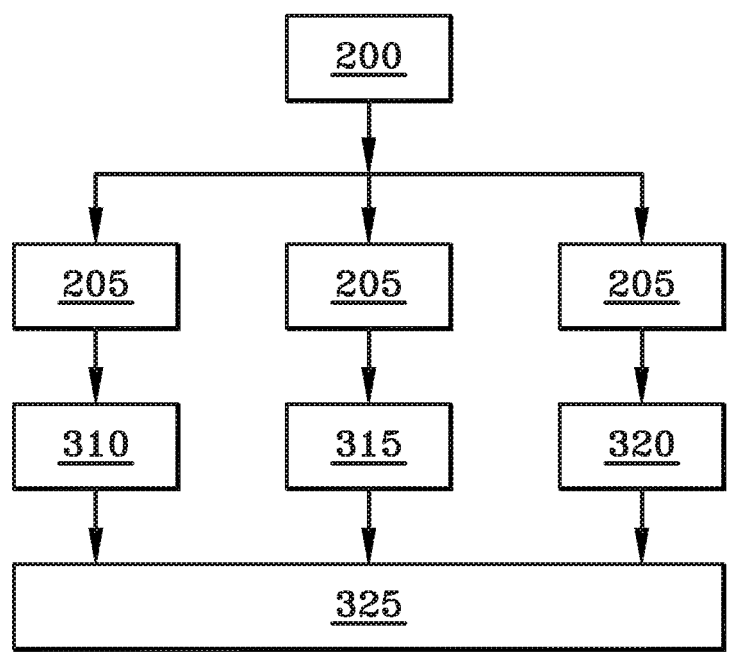
FIG. 3 (FIG. 3) is a schematic of the operation of a second type SVM in the first layer of the presently disclosed system according to one embodiment.

FIG. 3 is an example of an RBF SVM. The raw data, 200, is fed to an independent set of feature extraction operators, 205, which transform the raw data into independent views of the raw data according to distinct, domain appropriate analyses, filters, and transforms. These feature values are fed to a set of RBF SVMs, 310, 315, and 320, with the output of the RBF SVMs sent to the next layer.

The fact that FIG. 2 and FIG. 3 illustrate first layers of this network comprised of single types of classifiers only serves to reinforce the flexible architecture of this network as a result of training with a feature selection process that is associated with each classifier. It is well known in this field that different types of classifiers have distinct properties with respect to developing decision boundaries, so that each type of classifier has unique strengths in application to particular types of data and problem domains. If, in a particular manufacturing application, a network comprised purely of linear SVM's only is determined, as a result of training, to be the optimal network configuration for that particular application, it is also easy to see that in a different application the optimum network configuration may be one consisting exclusively of RBF SVM's. It is a particular advantage of this system that either configuration may be automatically generated as a result of training on the data from each application, or in fact resulting in any particular combination of individual classifier types and their sequences within the network forming any combination of compound classifier types.

The "sidecar" technique developed for this classifier, for recursive feature elimination, uses a linear SVM in parallel with any other type of classifier. In this process, both the "target classifier" (the type of classifier which will be used with the feature set after selection of a subset of the full set of features) and a linear SVM are trained in parallel. At each step in the iteration, the error rate (or any other comparable measure of classification performance) for the target classifier is recorded. It is also possible to wrap hyperparameter selection around the target classifier at each iteration as well; in that case the hyperparameters associated with the lowest error rate measure for the target classifier are also recorded. After training both the target classifier and the linear SVM on the current feature set, the array of coefficient magnitudes obtained from the "sidecar" SVM is used to eliminate one or more features from the current set. The sidecar method then provides a simple, efficient ordering technique to choose which features to eliminate at each step, avoiding the computationally intensive process of evaluating the target classifier's performance with each feature removed individually (or worse, within unique groups). The trained target classifier, along with the associated best hyperparameters are then saved in a data structure. At the end of the recursive feature elimination process, the target classifier with the lowest error rate measure is retrieved for use in the running system. For efficiency in our implementation, a fixed, predetermined percentage of features to eliminate at each step is a parameter input to the training procedure, and results in an efficient, exponential rate of reduction of feature set sizes; this tends to equalize the amount of time spent optimizing feature sets across feature types with widely differing sizes which include feature sets, each with thousands of features.

The most comparable measure of classifier accuracy to the new margin area measure disclosed here for the first time, and used in our implementation, which can be used for feature set evaluation, is the AUC which is the area under the ROC curve. Using SVM terminology, the AUC measure is not sensitive to the margin width, nor its' shape, in the sense of how "clean" the margin region is. This can be seen by a simple comparison between the AUC's for two different types of distributions. If the distribution for each class is Gaussian, with finite support (truncated Gaussian tails), and the data from the two classes are just separate enough that there is no overlap, then the AUC will achieve its' maximum value, and the ROC curve is ideal and cannot be further improved upon. Separation of the two Gaussian distributions further will yield no gain in the AUC, and the ROC curve will retain the ideal form. If we consider uniform ("boxcar") distributions with exactly the same areas and locations of their means as the truncated Gaussians, the area in the "valley" between the two distributions will further increase, with the margin region (in SVM terminology), becoming even cleaner. This transformation still yields no change in the ROC curve, and therefore no gain in the AUC. It is clear that greater separation between the truncated Gaussians is likely to yield better performance in the field, as proven by the theoretical analyses of the margin maximization optimization of the SVM, as well as the situation described by the more compact, uniform distributions.

In order to take advantage of the above distinction, by modifying the standard AUC, the present disclosure begins the computation of a "margin area" measure by generating normalized cumulative distributions for each of the two classes during cross-validation testing of an SVM. The cross validation error rates for each class, obtained from a large number of bootstrapped cross-validation training/testing cycles are then recorded as the SVM output threshold is varied. Variation of the output threshold corresponds to shifting the hyperplane towards either class distribution, along the discriminant axis. The threshold is varied over a predefined number of steps from a value well beyond one side of the margin region (the SVM margins are defined to be at +/−1.0) to well beyond the other side of the margin region (we use limits something like −2.0→+2.0). As the SVM output threshold is varied from the lower limit to the upper limit, the average cross-validation error rates for each of the two classes range from low to high, although in opposite directions. This allows visualization of the margin region in system development/debugging as the margin area measure is accumulated over the threshold range. As these curves are monotonically increasing or decreasing, according to class, the union of these two curves, such that the maximum error rate is taken at each sample point, yields a curve which looks like a smooth valley between two plateaus of approximately equal height (approaching a value of 1.0 at either end). The margin area developed for this classifier is based on the area above this curve, below a predefined threshold for average error rate. An upper error rate threshold is used in order to focus on the lower error rate region of the "margin valley", not allowing the shape of the valley above a (usable) error rate limit to affect the comparison between feature sets in the iterative feature selection process. The square of the depth below the error rate threshold, integrated over the data below the error rate threshold, is also used to further reinforce a bias towards low average error rates in the margin valley region of interest. In development and testing of this classifier, visualization of the union of the two average error rate curves, over the feature set iterations, makes it quite clear which combinations of SVM types and feature types exhibit wide, deep margin valleys over a range of feature set sizes, in comparison to feature types which exhibit narrow and/or shallow valleys. These visualizations can then also be used as a guide to choice of classifier types, hyperparameters, and feature types in development of more generic classifier applications.

There are a number of alternatives which appear in the literature as multi-view system architectures, but that do not have the particular benefits in terms of robustness and accuracy that our particular architecture exhibits. One alternative is that a system may also use a filter method instead of a wrapper method for feature selection, in which a measure of discrimination utility of each feature is used in a predictive, feed-forward fashion to rank features within each set or view, instead of a measure of accuracy using a classifier (as in the wrapper method). However, two primary deficiencies exist in use of the filter method. First, measures of potential classification utility of each feature, such as the Fisher score, are obtained for each feature in isolation; therefore the effect of any potential synergistic combination of features working in concert is not brought into the feature selection process. Secondly, utilization of relatively simple measures such as the Fisher score, or correlation based measures, diverge significantly from the performance that will actually be seen using a classifier with a sophisticated optimization algorithm, such as the SVM. Even a classifier as simple in implementation as the k-NN classifier can provide classification results much superior to those estimated from simple measures such as the Fisher score, if the data exhibits sub-clusters, because of the non-linear nature of the decision boundaries developed by the k-NN classifier (or other non-linear classifiers)—even in one dimension, as is the case when estimating the utility of each feature in isolation. Therefore the combination of methods described in this document that are utilized to effect feature selection via the wrapper method, including extensive utilization of bootstrap cross-validation, the sidecar SVM control of the recursive feature elimination process, and the modified margin width estimation, used in concert provide a sophisticated feature selection process resulting in robust, high accuracy classifier systems.

In other common multi-view architectures as described in the literature, the manufactured part classifier output may be a simple majority vote, average, or robust statistical combination over the ensemble of SVM's, or any other non-linear method, predefined, or learned during training, in which the data from each view is processed independently until combined at the output. In the most common representative of the multi-view paradigm, independent classifiers are used to process feature types/views separately, followed by a simple ensemble combination of the individual feature group classifiers. Therefore there is either no capability of learning potentially synergistic correlations across individual features over the set of views; only the use of a learned, weighted combination of sub-classifiers from each view at the output of the system. In our classifier, we employ methods that offer benefits of both independent and joint processing of distinct feature groups that form the multi-view front end. Since feature selection is used at each node at each level of this system, the flexibility of this approach is such that the resultant classifier may represent, with respect to processing the feature data from the set of views, an ensemble of intermediate results derived from each view in complete isolation from all other views, an ensemble which uses a weighted combination of features across all views, or some intermediate combination of these two extremes of independent or joint use of information across views. Of particular note is the functionality of node-specific feature selection, such that if a classifier trained as a single output unit is used at the final layer, all possible combinations of features selected across the pooled feature set, in conjunction with all possible combinations of distilled projections of views are possible after training, as active features in the operational network. In complementary fashion, all possible configurations of compound classifiers are possible as well, from a single compound classifier type, to all compound classifier types participating in the processing of raw input data for manufacture part anomaly detection.

FIG. 4 is a schematic of the second layer 128 of SVM system. As seen in FIG. 4, there are three distinct types of inputs to the second layer. Input block, 400 are the linear SVM outputs from the first layer. Input block 405 are the outputs of the pooled feature data from the first layer, and input block 410 are the RBF SVM outputs from the first SVM layer. There can be multiple layers of SVMs as needed so each layer can provide input to the next layer. This architecture is also easily extended to other types of trainable classifiers, in parallel with the linear and RBF SVM's, such as SVM's with other forms of kernel (polynomial, sigmoid, etc.), k-NN classifiers, Bayesian classifiers, or any other type of classifier that can provide a real valued output representing classification confidence. It should be obvious that aside from the linear SVM's used in the sidecar RFE mode, any combination of distinct types of classifiers with real valued outputs may be used in parallel, at the discretion of the system designer.

Figure 4A:
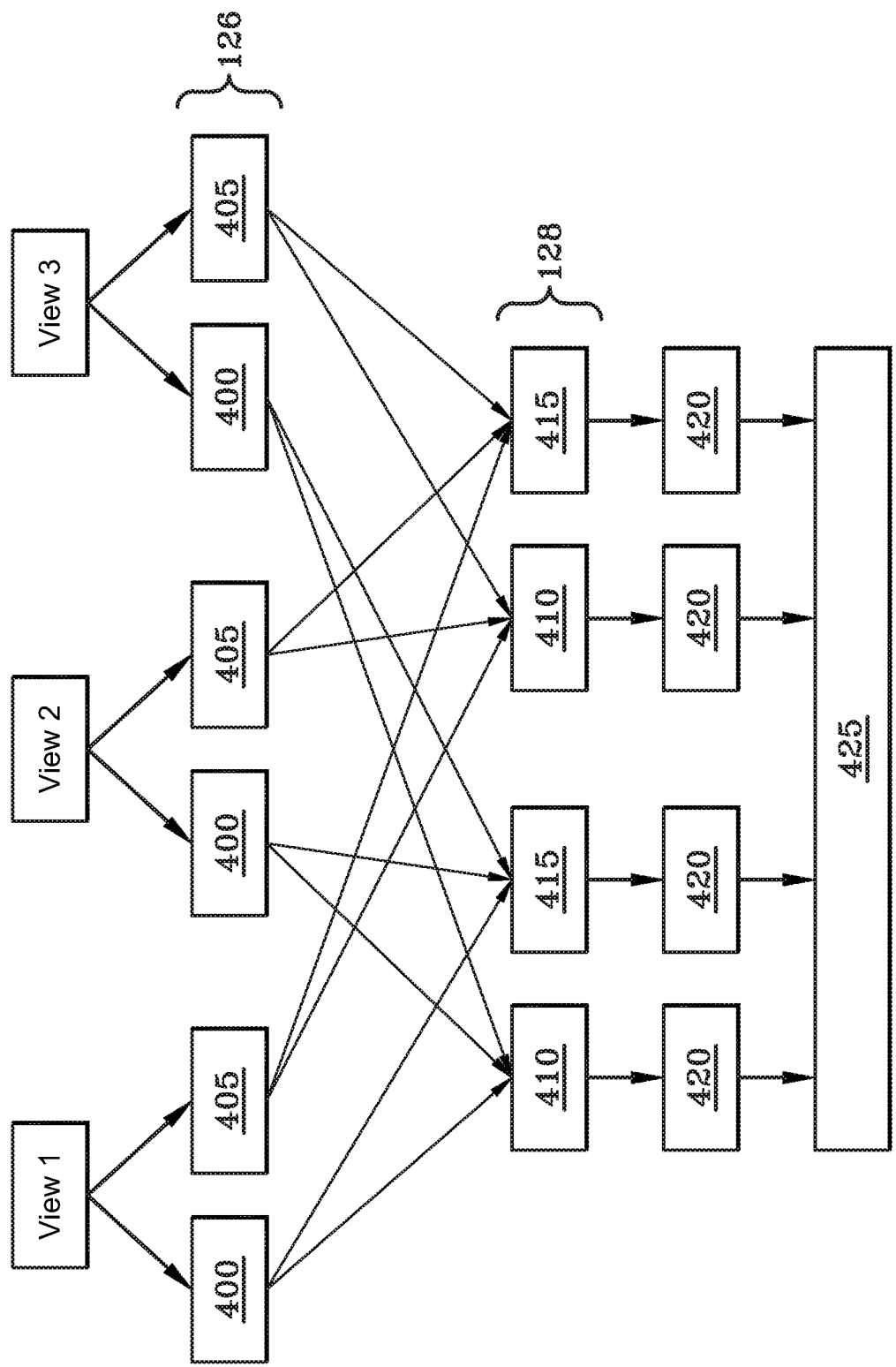
FIG. 4A (FIG. 4A) is a schematic of the operation of a second SVM layer of the presently disclosed system according to one embodiment.
Figure 4B:
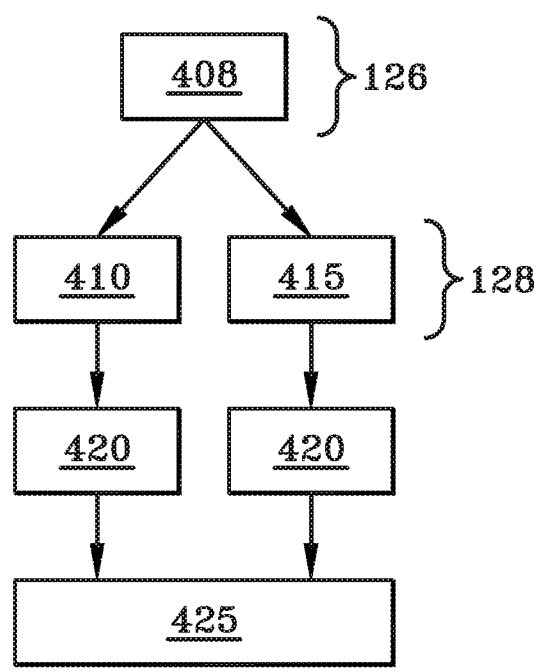
FIG. 4B (FIG. 4B) is a schematic of another exemplary operation of the second SVM layer.
Figure 5:
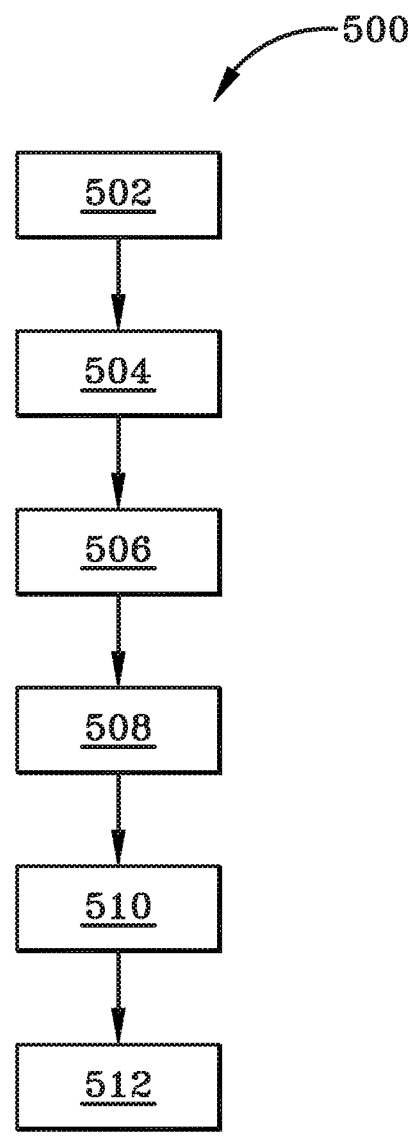
FIG. 5 (FIG. 5) is a flow chart in accordance with an exemplary process according to one embodiment of the present disclosure.

In one particular embodiment, employing the ensemble of classifiers architecture as illustrated in FIG. 4A, blocks 400 represent the linear SVM's in the first layer, and blocks 405 represent RBF SVM's in the first layer. Blocks 410 in FIG. 4 represent a linear SVM in the second layer, and blocks 415 represent RBF SVM's in the second layer. In this particular figure, the compound classifier types "Linear SVM→Linear SVM", "Linear SVM→RBF SVM", "RBF SVM→Linear SVM", and "RBF SVM→RBF SVM" are illustrated. This system can have more SVMs in the first, second or any layer which would then create additional compound classifier types. The SVM's are not limited to RBF and linear types, but can be of any type of SVM as desired. The outputs of the second layer SVMs, 415 and 420 are then normalized, in a robust fashion, based on the distributions of the output data from these nodes during training, for dynamic range, so as to equalize the relative impact of the outputs of each classifier across the output layer. These normalized outputs are then processed by sigmoid functions, which limit and equalize the output ranges, asymptotically, across the output layer. The combined functions of normalization and the sigmoid transfer function are referred to as an adaptive sigmoid, and are shown in FIG. 4A as blocks 420. The outputs of the adaptive sigmoids, in this embodiment of an ensemble classifier, are then processed by a statistical function in order to generate a single output value representing a robust combination of the classifiers in the second layer after processing by the adaptive sigmoid functions. In addition to this set of compound classifiers feeding the output layer, there are also two more compound classifier types, "Pooled→Linear SVM", and "Pooled→RBF SVM", as shown in FIG. 5, which also feed into the output layer through the same type of adaptive sigmoid functions. In FIG. 4B, the block 408 represents the pooled set of selected features collected from the feature selection process that has taken place during training at the first layer. Therefore the output layer takes inputs from all six types of compound classifiers, for a robust combination of results across these six classifier types, with the configuration adaptive based on the training data as previously discussed.

At the level of the hidden layer 128 in this architecture, there are two distinct and complementary ways of generating feature spaces for input to the second layer of SVM's. The first of these methods is the use of the first layer of SVM's not as classifiers for ultimate use in an ensemble, but as a way of generating optimized projections into a more discriminative feature space which is a 2*n-dimensional space where n is the number of our independent views (feature types). Note that if more SVM or other classifier types are used, then the discriminative feature space size will be p*n, where p is the number of SVM and/or other distinct classifier types. In the classifier described in this document, the second layer, consisting of the two basic types of SVM's, each operating on the array of outputs of the first layer, can then also function as either an ensemble of classifiers, or a second level of further discriminative projections into a further optimized second feature space. This aspect of the architecture provides a way of extracting the most discriminative information (optimized SVM projections) from each view (feature type) independently, followed by optimized combinations of these projections in order to take full advantage of the benefits of multi-view processing. The present disclosure next describes a complementary method of joint use of feature data selected across the multiple views that is used to augment the space of optimized projections.

The second method is the pooling (with a limit to the number of features allowed to be pooled from each feature set) of the features selected by each SVM during training. This combination of two basic techniques achieves two primary goals: The first is to provide diversity in feature spaces at the hidden layer. The set of 2*n projections allows optimization within each feature type in isolation of features from other types. It is important to maintain the integrity of the multi-view paradigm this way so that multiple manifestations of the underlying anomaly can be detected with some level of independence. The pooling technique, in a complementary fashion, provides an optimized set of features (optimized through the feature selection process) pooled so that synergistic interactions from features in distinct feature groups can be utilized by SVM training using the pooled feature set in the next layer, if such synergistic interactions exist. They likely do, since all features extracted from the same image will clearly have some level of correlation with each other, and the choice of a range of feature extraction operators (feature types) is somewhat arbitrary and can never be completely comprehensive (due to the problem of sampling from a distribution which can never be truly known). The second is to provide some equalization of the weight, in terms of feature set sizes, across feature types. It is well known that while a small set of highly discriminatory features may exist in a large set, their effect may be swamped due to a much larger set of noisy and/or non-discriminatory features especially when the amount of training data is relatively low. These two sub-methods—view projections and pooling across views, both provide for some equalization of the relative weights of feature types in the overall process of classification in different ways.

The first sub-method (projection method) equalizes the size of each feature group presented to the second layer, since only two outputs, the SVM projections for each of the two SVM types, become components of the intermediate feature space upon which the second layer SVM's operate. Note that the four types of second layer compound SVM's (Linear→Linear, Linear→RBF, RBF→Linear, RBF→RBF) operate only in this feature space.

The second sub-method for feature set size equalization is the pooling technique. This method carries less equalization power, as a variable number of selected features are submitted to the pool from each feature group. Since it is still possible for the optimum feature set from any large feature group to be comprised by a subset of the most highly ranked features from that group, the limit put on the number of (rank ordered) features from each group which can be submitted to the pool can be adjusted, either manually or automatically, to balance the potential discriminatory information supplied from the features associated with each feature extraction operator (view), and the need to balance the relative weights from each view. The pooled selected features then serve as a separate feature space at the second level, and are input to the two basic SVM types for training. The additional two types of compound classifiers (Pooled→Linear, Pooled→RBF) are associated with the pooled feature set, and provide the last two output nodes from the second layer.

While there is recent work on stacked classifiers of both traditional hidden units and SVM's in the literature, these papers do not report the use of hidden unit specific feature selection techniques. The feature selection techniques reported for use in the classic MLP's and more recently, deep learning based classifiers, are not applied at the level of hidden units, but are evaluated using methods like "optimal brain damage", and dropout-based techniques, which are classifier wide approaches. By applying feature selection independently at each hidden unit, the complexity of the classifier is controlled, since applying feature selection (or hidden unit selection) over an entire classifier adds additional complexity, expanding the possible configurations that the manufactured part classifier may reach after training, which may counteract the benefits of feature selection. In addition, the system of the present disclosure uses extensive cross-validation at each hidden unit (SVM) to evaluate each candidate feature set; this would easily become an unreasonable additional burden on CPU resources if bootstrapped cross-validation would be used, as a wrapper, over the entire classifier due to the fact that each SVM/node is trained using the wrapper technique with embedded bootstrap cross-validation. Evaluating a deep neural network classifier (DNN), or even classic multi-layer perceptron (MLP), in a wrapper formulation for feature selection is essentially impractical due to this burden on CPU resources and training time.

The use of SVM's to construct hidden layers provides optimized feature spaces at each hidden layer level, when coupled with feature selection, especially when the size of the available training datasets is relatively low. The theoretical guarantees of generalization performance for large margin discriminants is augmented in practice when the complexity of the classifier is reduced through feature set selection to better match small training dataset sizes. The classifier system described herein optimizes the generalization performance by incorporating feature selection as an integral component of training each SVM node in the manufactured part classifier. The utility of each candidate feature set is evaluated using the wrapper method (SVM's are re-trained at each feature set iteration), which gives the most accurate estimates of utility by making extensive use of bootstrapped cross-validation to estimate relative feature set quality using the margin area measure described above.

Architectures employing ensembles of classifiers of diverse architectures increase robustness in the overall system. In this exemplary classifier, unique sequences of classifier types form compound classifiers on a layer-by-layer basis. The present disclosure uses two basic, common types of SVM's as a basis for diversity.

In this classifier architecture, starting from two basic types of SVM, the exemplary system builds up, at the second layer, a set of six unique types: Linear SVM array→Linear SVM, Linear SVM array→RBF SVM, RBF SVM array→Linear SVM, RBF SVM array→RBF SVM, Pooled→Linear SVM, and Pooled→RBF SVM. Since the distributions in the feature space formed by the two SVM types have distinct properties given the same training data, as do the resultant distributions at the outputs of the two SVM types which operate on the distinct distributions of the two "types" of input feature space data (distilled projections and pooled features), then it is clear that each of what has become a set of four classifier types presents different distributions at each of their outputs, so that each classifier type is not only unique in form, but more importantly, in their output distributions. It is the variation of output distributions which add robustness to the output of the ensemble of classifiers, assuming that the error rates of each type of are roughly equivalent. It is clear then, that the use of multiple types of compound SVM's adds classifier diversity to the diversity of the multi-view feature extraction process.

Since there is no inherent limitation in this architecture on the number of layers, there is no restriction, excepting the size of the training data pool, to adding a third layer. For this analysis, a third layer consisting of two SVM types could, for a new set of SVM's, take all combinations of inputs of the six second layer SVM outputs. In this case, an exemplary system of the present disclosure could form, restricting itself to using at least two third layer SVM's, a further expanded set of unique classifiers would be available for use in ensemble form at the output of the third layer. The classifiers at the proposed third layer would be of the form "all classifier types→linear", "all classifier types→RBF", and so on. Then, in the example of adding two distinct SVM types at a third layer, a total of 12 distinct sub-classifier types would be defined. Also note that this system is not restricted to using SVM types, since using the sidecar method for feature selection, additional classifier diversity could be added by the inclusion of additional classifier types, such as weighted k-NN classifiers or traditional Bayesian classifiers, as long as they have the capability of real valued outputs. In the case of the k-NN type, we can use some function of the distance measures to the nearest training tokens to indicate both class and confidence (the weighted version of k-NN), as the outputs of the SVM do. Adding classifier types multiplies the options we have for classifier diversity, theoretically improving robustness, as long as the overall classifier capacity, in the sense of the VC (Vapnik-Chervonekis) dimension, is kept within the proper limits given the amount of training data available. While it is impractical, from a standpoint of CPU resources, to use bootstrapped cross-validation accuracy estimation for the entire classifier system (as a whole), the expected accuracy at each layer can be estimated from the average of the chosen operating points of each classifier in a given layer, since each layer can be considered an ensemble of classifiers, using, for example, the mean over the set of classifiers at each layer. Note that this applies to layers at the third level and beyond, as the first two levels are pre-defined, based on the use of both the pooling and projection based techniques in learning, through training, the optimum combination of features across views. The expected generalization performance can then be monitored as layers are added, at a third level and beyond, and the optimum number of layers determined by the mean cross-validation accuracy at each layer, stopping when this begins to degrade as the capacity of the classifier (in the VC dimension sense) exceeds what is allowable with respect to the amount of training data available. Similarly, adding diversity within each layer, by adding new types of SVM's or classifiers, as previously discussed, can be done starting at the first layer of SVM's. Referring to FIG. 1, this would be equivalent to adding, in parallel with the hidden units 125, say, hidden units 126, 127, 128, and so on, each of these being, for example, an SVM with a polynomial kernel (126), a k-NN classifier (127), a Bayesian classifier (128) and continuing with other non-linear classifiers with real valued outputs. While diversity in general adds robustness to an ensemble, but only if the added classifiers are generally in the same range of accuracy. A classifier with sub-standard performance for data of a given domain can degrade the performance of an ensemble. On the other hand, the potential cooperative effects between groups of sub-optimal features (which the hidden units become at the next layer) can also not be ignored. It is clear then, that the way to evaluate incremental performance gains by adding SVM's, or other non-linear classifiers to a given layer is by monitoring the mean accuracy at the next layer. This is computationally feasible, as only the succeeding layer needs to be re-trained in order to estimate the incremental benefit of additional classifiers added to the preceding layer. As before, that estimate would simply be the mean accuracy of the ensemble of classifiers at the next layer, after re-training with each additional classifier. The computational burden of retraining one succeeding layer, as each new type of classifier is added to a preceding layer is relatively low, as at these levels the number of features being transmitted to the next layer is quite low; this is in contrast to the extremely high cost in computation time of re-training the entire network using bootstrapped cross-validation each time a new hidden unit is added. That high computation cost is due to the fact that with each bootstrap sample of training data selected as one of the training data sets for the overall network, that each hidden unit will then be trained with it's own bootstrapped cross-validation process, effecting a hierarchy of bootstrapped cross-validation within bootstrapped cross-validation, with the resultant high computation cost. Thus it is clear that the method we present here allows, due to the use of bootstrapped cross-validation at each hidden unit, the incremental addition and evaluations of new types of SVM's or other non-linear classifiers to each layer, as well as new layers to the overall network, with an efficient means of evaluating the effect on overall classifier performance which inherently includes statistical use of cross-validation results from the process of bootstrapping without needing to apply bootstrapped cross-validation to the entire network each time a hidden unit is added to a layer, or a complete layer is added.

FIG. 5 is a flowchart that depicts an exemplary method according to an exemplary embodiment of the present disclosure generally at 500. Method 500 includes testing a manufactured part for anomalies with a two layer arrangement discussed herein, which is shown generally at 502, wherein the testing 502 comprises receiving at least one set of feature values data from at least one sensor or the manufactured part, which is shown generally at 504. The testing 502 includes extracting at least two sets of refined data, wherein the at least two sets of refined data are sets of numbers representing the feature values data extracted from the sensors or manufactured part using feature extraction operators, which is shown generally at 506. The testing 502 includes classifying the at least two sets of refined data as a representation of a property or output of the part and storing the at least two sets of refined data as stored data, which is shown generally at 508. The testing 502 includes performing, via a first layer of at least two support vector machines (120 and 125), anomaly detection of the manufactured part using the stored data and performing, via a second layer of at least two distinct types of support vector machine, anomaly detection of the manufactured part using the stored data, which is shown generally at 510. Method 500 uses the second layer of support vector machine outputs to compare or combine the results to determine the presence of an anomaly, which is shown generally at 512. Method 500 can further provide that the feature values data represents data from a scan, image, test, or output of the sensor or manufactured part.

The method 500, may further comprise determining a severity level of an anomaly wherein the anomaly detection indicates the presence of an anomaly, and wherein the severity level is indicated by the real valued output of the network. Accordingly to one specific embodiment, the method does not use more than a binary decision in this system, although internally all outputs are real valued. Notably, the anomalies may not assign bins to the classification outputs in this system. In one embodiment, this is only done by definition, after expert examination of the results of the classifier on the training data, in combination with considerations like cost, human factors, and so on. In some instances, method 500 is cloud based. In other instances of method 500, the at least first and second support vector machines are different. If there are two SVM's of the same type, taking the same inputs, then they must be trained so that they will have some distinction from each other. While the bootstrap training will provide some of that variation, it is likely that there will be utilized different hyperparameters for each of the SVM's of the same type, in order for each SVM to have distinct properties. In this method 500 the support vector machines are typically either RBF or Linear, but may also be other types of SVM at the discretion of the system designer, or even other forms of non-linear classifier. Additionally, a statistical function, or else an output support vector machine operating on the second layer of support vector machines in order to compare, contrast, or analyze the ensemble outputs of the second layer of support vector machines is used to provide the function of anomaly detection and indication of severity in the manufactured part.

Additionally, method 500 may include, wherein performing, based on the two layer support vector machine technique, anomaly detection on the part using the stored data comprises: constructing an anomaly classifier based on a decision directed system; and calculating the presence of an anomaly based on the stored data which determine the outputs from the trained support vector machines (or other classifier types) wherein the presence of the anomaly is indicated by the output of the overall system crossing a threshold determined during the training process. Notably, the stored data, in the case of an SVM, are the coefficients. If any nearest neighbor based classifiers are used, then the stored data would be selected examples (or all exemplars) from the training data.

The system of the present disclosure that implements method 500 or another exemplary method, this exemplary system comprises at least two "views", or feature types generating transformations of the raw data into arrays or matrices of feature data for each type. This system further provides at least two different types of classifiers. In this system, these can be any trainable classifier (which includes k-NN, which is actually trained in the sense of storing exemplars or prototypes, and can also be trained using hyperparameters for the more flexible versions) which has, or is configured to have real valued outputs representing some form of statistical confidence in classification. For this system, a feature selection method is associated with each classifier. This can be any form of feature selection method (and there are many, such as filter, wrapper, forward search, backward search, mixed methods and so on) used to winnow down the set of feature data from each view that will be used as input to each classifier during system operation.

In this exemplary system, there is a first layer of at least two distinct types of classifier operating on the features output from each view (so in the simplest case, 2 views*2 classifier types=4 classifiers at the first layer). This system further includes a feature pooling function that combines the sets of selected features from each view into the "pooled feature set". This takes place after the sets of features is selected from each view. The selected features are pooled over only the selected features from one classifier type (the linear SVM, currently). The pooling may be or would be done using all features selected for the first layer classifiers.

This system includes a set of distinct classifier types (at least two), operating on the pooled feature set. This is an auxiliary set of classifiers at the first layer, or at the second layer. There is an output function, in order to combine the ensemble of outputs from the second layer of classifiers. This function can either be a statistical combination across all second layer classifier outputs (mean, robust mean or min or max, etc.), or one final classifier trained to effectively weight the combination of second layer classifier outputs. There are benefits to both approaches—the statistical combination effects an ensemble of classifiers, while adding another trainable classifier at the single output unit potentially optimizes the combination of second layer classifier outputs, but also loses the ensemble nature, and is potentially subject to over training (which is part of the reason to use an ensemble—for robustness).

These elements combine to give the basic functionality of this system, namely, the ability to train classifiers which are totally focused on a single view, allowing a lower ratio of (# features)/(# training tokens), for generalization performance, isolation of better features sets from noisier ones, and optimized detection of different types of anomalies through focused use of different feature extraction operators. Further, these elements provide a provision of classifiers which also explore the potential of synergistic coordination of features across feature groups (across views). This complements the use of isolated classifier based processing of each view independently, if such cross-view synergies exist.

In this system, feature selection provides several important functions. First, optimization of generalization performance of each classifier in the network by trimming away noisy or irrelevant features, and reducing the ratio of (# features)/(# training tokens) which is so important for performance in the field, especially given the target of relatively small amounts of training data. Second, it provides a way to pool features from different views so that there is some control over the disparity in the number of features sent to the pool from different views.

Since feature selection is used at the input to each classifier, it allows the network to be trained, in a very flexible way, to isolate features from a single view, or a selected set of views, if that is optimum, whether they are in the pooled set or represent distilled projects from each view from the first layer of classifiers. It also enables the development of a network architecture which may represent a wide range of compound classifier types (compound types being types such as "Linear→RBF", or "Pooled→Linear"). This is particularly true if a final classifier/feature selection combination is used at the output—in that case we could wind up with anywhere from all compound classifier types in use, to only one, if we let the feature selection method go to the limit of one feature in the final output classifier (if we use a classifier as the final output, and not an ensemble); typically we would expect a mix of classifier types to be chosen by the feature selection at the output unit, though. It also allows the ability of the feature selection function to dynamically adjust the overall network architecture, in terms of the compound classifier types in use after training, extends to more varieties of compound classifier types if additional layers are added before the output unit or ensemble, as discussed in the section about the ability to extend the architecture layer by layer, if it is found to be beneficial to performance. Additionally, it permits the construction of multiple, compound classifier types for diversity. While diversity is known to have a beneficial effect on both robustness and accuracy, in general, by the same token it may be beneficial to have parallel, distinct, compound classifier types processing the data flowing through a network which has a single output unit as well as when it is in an ensemble form.

Additionally, the system may include the use of SVM's, for their theoretical properties of generalization performance based on the theory of large margin classifiers. The system may additionally add the efficient method of recursive feature elimination for feature selection. This is enabled by the incorporation of linear SVM's to control the feature selection process. In our current system, the linear SVM's do this on their own, and we use the "sidecar" linear SVM's in conjunction with the RBF SVM's to control the RFE process, since the efficient RFE process, using the magnitude of the SVM coefficients after training as an indicator of feature utility, is not compatible with RBF SVM's, and most other forms of non-linear classifiers. The system can implement a grid search/classifier hyperparameter optimization wrapper around the recursive feature elimination process in order to optimize any of the hyperparameters available for each type of classifier with regard to their training. The system can implement the process of bootstrapped cross validation error rate estimation to the recursive feature elimination process, where bootstrapped cross validation estimates of error rates are obtained with each iteration of the feature removal process. The system may additionally include a "margin area measure" to the estimation of the best operating point with respect to which feature set, over the set of iterations as features are removed, should be the feature set used in operation of the system for each classifier. The system may additionally include the sigmoid functions to control the dynamic range of the outputs of each classifier type, normalizing those across classifiers. The system may additionally include additional classifiers to each layer (also the layer processing the pooled feature set) as long as the outputs are real valued, representing a statistical measure of classification confidence. The system may additionally include an option of the incremental addition of additional layers, layer by layer, based on estimating cross-validation performance as the average of the estimated cross-validation accuracy at each new layer (stopping when this starts to degrade). The system may additionally include an option of the final output layer as either implementing an ensemble of diverse classifiers, using some statistical combination of classifier outputs, or else a final classifier utilized, with feature selection, to effect a network with a single, trained classifier as its final output, utilizing a weighted combination of the classifiers at the second to last layer selected through feature selection.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. It is a particular benefit of the multi-view architecture that it easily lends itself to the use of parallel CPUs. Most of the computational load will typically be extracting feature data for each view. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method comprising:
    testing a manufactured part for anomalies wherein the testing comprises;
        receiving at least one set of feature values data from at least one sensor or the manufactured part;
        extracting at least two sets of refined data, wherein the two sets of refined data are sets of numbers representing features values data received from the sensors or manufactured part;
        classifying the at least two sets of refined data as a representation of a property or output of the part and storing the at least two sets of refined data as stored data;
        performing, via at least a first support vector machine, anomaly detection of the manufactured part using the stored data and performing, via at least a second support vector machine, anomaly detection of the manufactured part using the stored data; and
        using at least a second layer including at least a third support vector machine that is the same type of support vector machine as the first support vector machine receiving outputs from the first layer, and at least a fourth support vector machine that is the same type of support vector machine as the second support vector machine receiving outputs from the first layer, connected to provide a parallel set of at least four compound classifier types, the outputs of which are compared or combined to determine the presence of an anomaly.

2. The method of claim 1, wherein using at least the second layer further comprises:
    at least a fifth support vector machine that is the same type of support vector machine as the first support vector machine receiving the pooled feature set as inputs, and at least a sixth support vector machine that is the same type of support vector machine as the second support vector machine receiving the pooled feature set as inputs, connected to provide a parallel set of at least six compound classifier types, the outputs of which are compared or combined to determine the presence of an anomaly.

3. The method of claim 1 wherein the feature values data represents data from a scan, image, test, or output of the sensor or manufactured part.

4. The method of claim 1 wherein the method is cloud based.

5. The method of claim 1 wherein the support vector machines are either radial basis function (RBF) or Linear.

6. The method of claim 1, wherein performing, based on the minimum specification of a network of support vector machines, anomaly detection on the part using the stored data comprises:
    constructing an anomaly classifier based on a decision directed system; and
    calculating the presence of an anomaly based on the stored data, wherein the presence of the anomaly comprises at least a difference at which an anomaly occurs.

7. An apparatus comprising:
    a storage unit, being configured to store at least one of a plurality of feature values data or a plurality of coefficients data in a features or coefficients database, wherein each of the feature values data comprises a plurality of feature values and each of the coefficients values data comprises a plurality of coefficient values;
    a non-transitory computer readable storage medium comprising instructions, which when executed by a processor, causes operations configured to:
        receive the feature values data of a manufactured part, wherein the feature values data comprises raw feature values data from a scan, image, test, or output of the manufactured part;
        extract at least two sets of refined data, wherein the two sets of refined data are numbers representing the feature values data received from the scan, image, test, or output of the manufactured part;
        classify the at least two sets of refined data as a representation of a specific mechanical property, chemical property, output of the manufacture part or other similar property of the manufactured part and storing the refined data as stored data; and
    a feature database of SVM coefficients or coefficients associated with any similar form of classifier after training coupled to the processor and configured to store, based on classification of the two sets of refined data, the two sets of refined data as the classified raw feature values data, wherein the processor is further configured to perform, based on at least ten support vector machines of at least two distinct types, in an arrangement forming at least two layers of support vector machines of at least two distinct types and an ensemble of compound classifier types formed by combinations of the distinct types of classifiers between a first layer and a second layer processing the at least two sets of refined data, anomaly detection on the manufactured part using the stored data.

8. The apparatus of claim 7 wherein the support vector machines are either radial basis function (RBF) or Linear.

9. The apparatus of claim 7, wherein the anomaly detection apparatus further comprises a central database coupled to the microcomputer and the feature database, and wherein the central database is configured to:
    parse the features values data to obtain parsed feature values data;

classify the parsed raw sensor data as classified parsed raw sensor data as a representation of a specific mechanical, chemical or other similar property of the part and storing, after classifying the raw parsed sensor data, the classified raw parsed sensor data, wherein the classified raw parsed sensor data corresponds to the at least two sets of refined data, wherein extracting the at least two sets of refined data from the raw sensor data comprises extracting the classified raw parsed sensor data from the raw parsed sensor data.

* * * * *